(12) United States Patent
Peterson et al.

(10) Patent No.: US 7,963,453 B2
(45) Date of Patent: Jun. 21, 2011

(54) VERSATILE HVAC SENSOR

(75) Inventors: Jeremy W. Peterson, Elko, MN (US); Sylvain Mayer, St-Jean-sur-Richelieu (CA)

(73) Assignee: Honeywell International Inc., Morristown, NJ (US)

( * ) Notice: Subject to any disclaimer, the term of this patent is extended or adjusted under 35 U.S.C. 154(b) by 426 days.

(21) Appl. No.: 12/123,221

(22) Filed: May 19, 2008

(65) Prior Publication Data

US 2009/0283603 A1 Nov. 19, 2009

(51) Int. Cl.
*F24F 3/14* (2006.01)
*G05D 22/02* (2006.01)
(52) U.S. Cl. .............. 236/44 A; 236/49.3; 62/176.1; 62/186
(58) Field of Classification Search .............. 236/44 A, 236/44 C, 49.3, 94; 62/127, 129, 176.1, 62/186
See application file for complete search history.

(56) References Cited

U.S. PATENT DOCUMENTS

| | | |
|---|---|---|
| 1,418,913 A | 6/1922 | Gold |
| 3,523,217 A | 8/1970 | Stiles |
| 3,618,659 A | 11/1971 | Rawal |
| 3,712,967 A | 1/1973 | Carson |
| RE28,154 E | 9/1974 | Stiles |
| 4,198,279 A | 4/1980 | Brown et al. |
| 4,618,266 A | 10/1986 | Feller |
| 4,706,808 A | 11/1987 | Guetersloh |
| 4,941,326 A * | 7/1990 | Sumi et al. ............ 62/180 |
| 5,252,260 A | 10/1993 | Schuman |
| 5,351,035 A | 9/1994 | Chrisco |
| 5,394,934 A | 3/1995 | Rein et al. |
| 5,396,796 A | 3/1995 | Kotani et al. |
| 5,844,138 A | 12/1998 | Cota |
| 5,922,939 A | 7/1999 | Cota |
| 6,254,008 B1 | 7/2001 | Erickson et al. |
| 6,555,748 B1 | 4/2003 | Gul |
| 6,834,529 B2 | 12/2004 | Head |
| 2006/0042410 A1 | 3/2006 | Arar et al. |
| 2007/0137318 A1 | 6/2007 | Desrochers et al. |
| 2007/0240490 A1 | 10/2007 | Desrochers et al. |

* cited by examiner

*Primary Examiner* — Marc E Norman
(74) *Attorney, Agent, or Firm* — Seager, Tufte & Wickhem LLC

(57) ABSTRACT

An HVAC sensor is provided that includes a housing that houses a sensor. In some instances, a conduit is provided that has a first end that extends out the back of the HVAC sensor housing and adjacent to (and sometimes through) a hole in a duct of the HVAC system that is situated behind the HVAC sensor. The sensor itself may be positioned adjacent the other end of the conduit outside of the duct, and sometimes inside the housing of the HVAC sensor. The conduit may direct pressurized air emanating from the hole in the duct toward the sensor, thereby allowing the sensor to sense a parameter of the air in the duct without actually positioning the sensor within the duct.

16 Claims, 4 Drawing Sheets

VERSATILE HVAC SENSOR

TECHNICAL FIELD

The present invention generally relates to Heating, Ventilation and/or Air Conditioning (HVAC) systems, and more particularly, to sensors and/or controllers used in conjunction with such HVAC systems.

BACKGROUND

Heating, ventilation, and/or air conditioning (HVAC) systems are often used to control the comfort level within a building or other structure. Many HVAC controllers include a controller that activates and deactivates one or more HVAC components of the HVAC system to affect and control one or more environmental conditions within the building. These environmental conditions can include, but are not limited to, temperature, humidity, and/or ventilation. In many cases, a controller of the HVAC system may include, or have access to, one or more sensors, and may use sensed parameters provided by the one or more sensors to control the one or more HVAC components to achieve one or more programmed or set environmental conditions. In some cases, the sensor(s) are provided in the same housing as the HVAC controller itself, such as in a conventional self-contained wall mountable thermostat and/or humidistat. In other cases, some or all of the sensors may be located remotely from the HVAC controller, such as in remote zones, in ductwork, or elsewhere. Often, the sensors are designed to only sense a particular environment relative to the housing that encompasses the sensor.

SUMMARY

The present invention generally relates to HVAC systems, and more particularly, to sensors and/or controllers used in conjunction with such HVAC systems. In one illustrative embodiment, an HVAC sensor is provided that includes a housing that houses a sensor. The sensor can be, for example, a humidity sensor, a temperature sensor, a carbon dioxide sensor, a carbon monoxide sensor or any other suitable sensor, as desired. In some instances, a conduit may be provided that has a first end that extends through the back of the HVAC sensor housing and adjacent to (and sometimes through) a hole in a duct of the HVAC system that is situated behind the HVAC sensor. The sensor itself may be positioned adjacent the other end of the conduit outside of the duct, and sometimes inside the housing of the HVAC sensor. The conduit may direct pressurized air emanating from the hole in the duct toward the sensor, thereby allowing the sensor to sense a parameter of the air in the duct without actually positioning the sensor within the duct.

In some instances, a conduit may be formed, at least in part, by a movable element that is movable between at least a first position and a second position. In a first position, the movable element may place the sensor in fluid communication with a first environment (e.g. inside a duct), and in the second position the movable element may place the sensor is in fluid communication with a second environment (e.g. a room via one or more convection vents in the sensor housing). In some cases, the first or second position may correspond to removing the movable element altogether, but this is not required or even desired in all embodiments.

In one example, the movable element may provide a conduit that, in a first position, extends to and sometimes through the back of the housing of the HVAC sensor and adjacent to and sometimes through a hole in a duct of the HVAC system that is situated behind the HVAC sensor. A sensor may be positioned adjacent the other end of the conduit, outside of the duct and inside the housing of the HVAC sensor. The conduit may direct pressurized air emanating from the hole in the duct toward the sensor, thereby allowing the sensor to sense a parameter of the air within the duct without actually positioning the sensor within the duct. In a second position (which may include moving and/or removing the movable element altogether), surrounding air from a room may flow through the housing and to the sensor, such as through one or more vents in the housing. Thus, in this example, in a first position, the movable element may place the sensor in fluid communication with air from inside a duct (e.g. a first environment), and in the second position, the movable element may place the sensor is in fluid communication air from a room (e.g. a second environment).

This may make the HVAC sensor quite versatile in its application. For example, such an HVAC sensor may be mounted to a duct with the movable element in the first position, or may be mounted to a wall with the movable element in the second position. In some cases, the HVAC sensor may include a controller for controlling one or more HVAC components of the HVAC system based, at least in part, on a parameter sensed by the sensor.

In some cases, the movable element may simply correspond to an electrical switch and/or programming option, rather than or in addition to a conduit. For example, when the HVAC sensor is to be mounted to a duct, an electrical switch and/or programming option may be set such that readings from the sensor are ignored or otherwise not used when the fan of the HVAC system is not activate (i.e. the pressure in the duct does not exceed the pressure outside the duct by a threshold amount). When the HVAC sensor is to be mounted to a wall, and not exposed to air from a duct, an electrical switch and/or programming option may be set such that readings from the sensor may be used regardless of whether the HVAC fan is active or not. These are just a few examples of how an electrical switch and/or programming option may be used as, or considered a movable element.

DESCRIPTION

Figure 1:
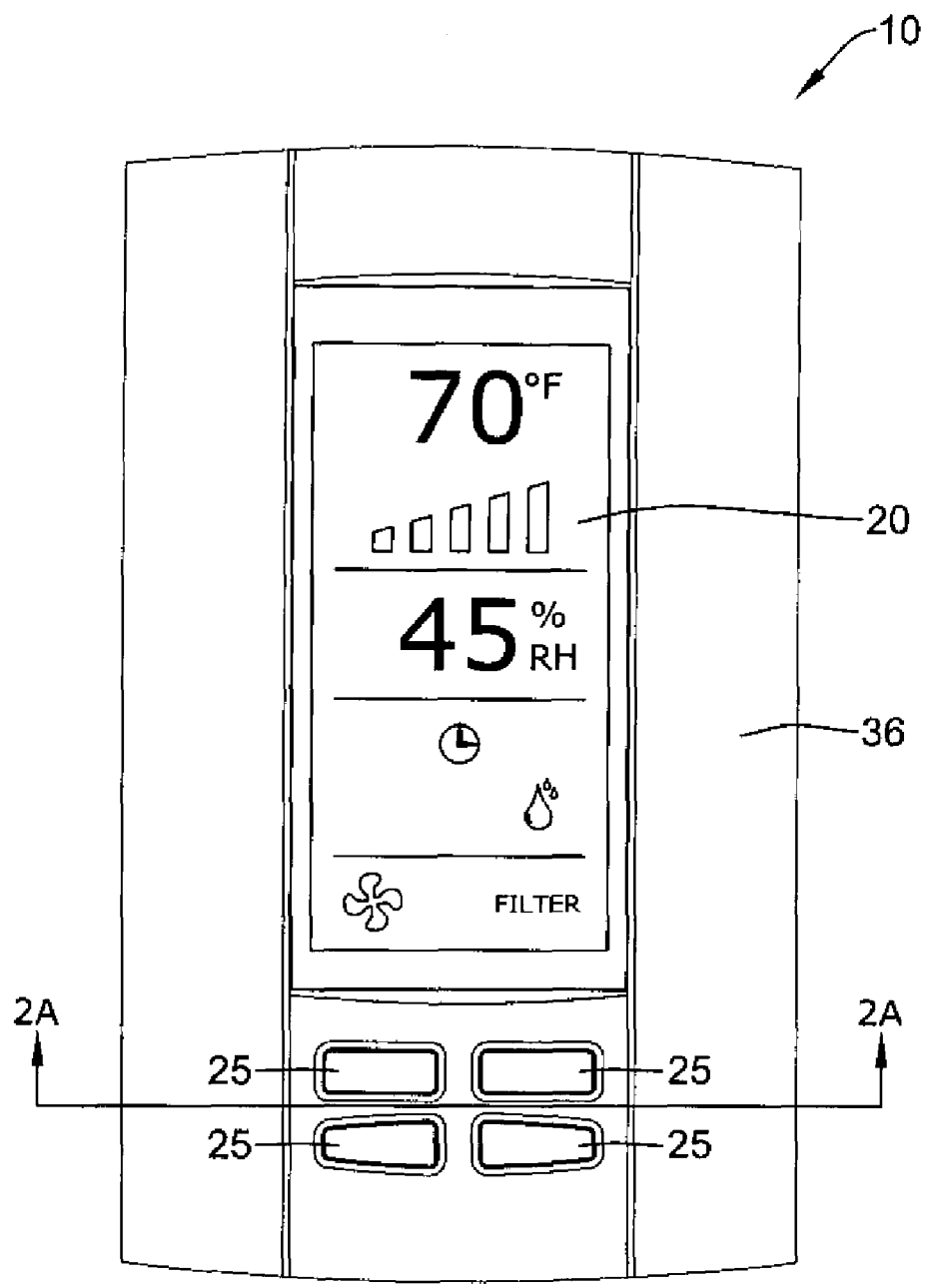
FIG. 1 shows a front view of an illustrative HVAC sensor.

The following description should be read with reference to the drawings wherein like reference numerals indicate like elements throughout the several views. The drawings, which are not necessarily to scale, are not intended to limit the scope of the claimed invention. The detailed description and drawings illustrate example embodiments of the claimed invention.

All numbers are herein assumed to be modified by the term "about." The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

Figure 2A:
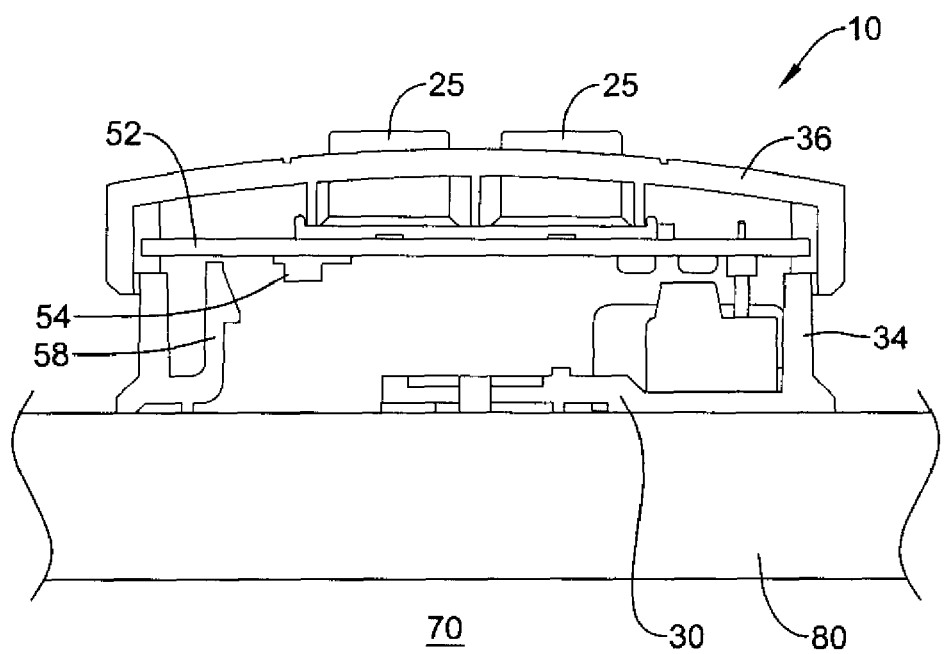
FIGS. 2A and 2B are sections of the illustrative HVAC sensor of FIG. 1 taken along line 2A-2A in two different mounting configurations.

Systems have grown in complexity from simple heating systems with a single wall mounted thermostat to whole building environmental control systems. As structures served by such whole building systems have grown in size and complexity, and depending on the circumstances, it has been appreciated that it is sometimes desirable to sense the conditions within rooms of a building, and at other times it may be desirable to sense the conditions within ducts that serve to distribute air in the building. Accordingly, the present inventors have devised an HVAC sensor, such as a thermostat and/or humidistat, which may be mounted on surfaces such as walls as well as on the exterior of ducts, and sense a desired environment, without extensive modifications to the HVAC sensor, the wall, or duct as desired. One such HVAC sensor 10 is illustrated in FIGS. 1-3.

Such a versatile HVAC sensor 10 may be used in most if not all of the environments to be sensed, and do so without requiring major reconfiguration and/or discarding of structural elements. Such an HVAC sensor 10 may simplify installation of the device and related components, and may reduce the number of components that a manufacturer and contractor must keep in stock or have readily available. To achieve this versatility, and in some illustrative embodiment, a minor element of the HVAC sensor (e.g. a movable element 50) may be positioned or repositioned at the time of installation to select whether the HVAC sensor 10 is to sense and/or control a room environment in which the HVAC sensor 10 is mounted, and/or to sense the environment within a duct 70.

In some embodiments, the movable element 50 is essentially fixed at the time of installation and the remaining components of the HVAC sensor 10 may remain unchanged. In one example, in a wall-mounted installation (see, for example, FIG. 2B), the HVAC sensor 10 may be simply mounted to a wall 80, and a movable element 50 may be configured to allow convective air to flow over an internal sensor 54 through one or more vents 82, 84 in the HVAC sensor housing (see, for example, FIG. 3). In a duct-mounted installation (see, for example, FIG. 2B), the movable element 50 may be configured to extend adjacent to a relatively small hole in a duct 70 to allow the HVAC sensor 10, which is located outside of the duct 70, to sample the environment within the duct. In both of these illustrative configurations, the actual sensor 54, and associated control module if present, may be situated outside of the duct 70 and within the HVAC sensor housing.

It is contemplated that in some surface or wall mounted configurations, at least a portion of the HVAC sensor housing may be located in a recess, such as an electrical box within the mounting surface in order to provide a nearly flush installation, but this is not required. In other surface mounted configurations, a base plate may be adapted to mount to an electrical box in the surface, with the electrical box providing communication to one or more HVAC components to be controlled by the HVAC sensor 10 or to which the HVAC sensor 10 conveys information about an environment. In yet other surface mounted configurations, the HVAC sensor housing may be mounted directly to the wall 80, as shown in, for example, FIG. 2A. Although the HVAC sensor 10 may include a humidity sensor, a temperature sensor, a carbon dioxide sensor, a carbon monoxide sensor and/or any other suitable sensor(s), the discussion that follows sometimes focuses upon humidity sensors and or combined temperature/humidity sensors to simplify the description of certain illustrative embodiments. This focus should not be taken as limiting the scope of the invention with respect to the types of sensors contemplated.

The HVAC sensor 10 may include a control module. In the illustrative embodiment of FIG. 2A, the control module may include or be mounted on a control module circuit board 52. The control module may be connected to and receive a signal from the sensor or sensors 54 of the HVAC sensor 10, and may include, for example, electronics to condition sensor related signals, comparators to determine when certain thresholds have been reached, and/or communication circuits to communicate at least one of sensor readings or control signals to associated equipment which is capable of influencing the environment within the room or duct being sensed. In some cases, the control module may be implemented, at least in part, by a microprocessor or microcontroller and supporting software, but this is not required.

The associated equipment may include, for example, a humidifier, a dehumidifier, an air conditioner, a furnace, and/or devices for introducing outside air. In certain embodiments, the control module may accept an input from a user interface of the HVAC sensor 10 that specifies a desired humidity, temperature or other set point. The input value may be provided by a remote device or from an internal storage unit, as desired. In other embodiments, the control module may accept a sensor signal related to the humidity and/or temperature in a first or second environment and generate a control signal related to the difference between the current value of the sensor signal and a desired value of the sensed condition. The control signal may then be communicated to an apparatus capable of adding and/or removing humidity from the environment being sensed and/or varying the temperature in the environment being sensed.

Prior to making the comparison, the sensor signal may be appropriately transformed or the desired value may be transformed to facilitate the comparison. For example, a numerical relative humidity value may be converted to an analog voltage and the analog voltage may be modified by an amount related to the current temperature in order to arrive at a voltage to be compared to the output of an absolute humidity sensor. Similarly, a humidity sensor reading may be converted to a digital value which subsequently may be manipulated by digital circuitry before being compared to the desired numerical value. In some cases, the output of the control module may be directly related to the sensor signal or it may be related to the difference between the sensor signal and a desired control set point. In some cases, it may include a binary on/off signal, a multilevel digital signal, or a continuously variable analog signal.

In some cases, the control module may store and retrieve desired values of relative or absolute humidity, temperature, and the like. These stored values may represent, for example, limits, set points, or other control settings. In some embodiments, the control unit may store a variety of selectable preset conditions appropriate to a season or time of day. In other embodiments, the desired sets of values may be associated with a future time or even a cycle of future times. For example, there may be a desired relative humidity associated with Monday mornings, a different value associated with Monday afternoon, and so on through the week, repeating the following Monday morning if desired. For this and other purposes, it may be desirable to include a clock in the control module and a display capable of indicating the current time in addition to the current and/or desired set point value of the relative humidity and/or temperature in the environment of interest.

In some cases, it may be desirable to locate the major components of the control module and other power consuming components of the humidistat and/or thermostat away from the humidity and/or temperature sensors to minimize inadvertent heating of the sensors which could lead to inaccurate readings. For example, it may be desirable to locate the sensor or sensors on a separate circuit board that is thermally isolated within the housing, or on surfaces of a circuit board opposite the power consuming components, but this is not required.

HVAC sensors may be configured as simple remote sensors in communication with a central climate control unit and/or they may include additional functions which may be locally accessed. For example, the illustrative HVAC sensor 10 of FIG. 1 includes a display 20 and controls 25. In some embodiments, the controls 25 may provide the capability to access, program and/or store various settings of the HVAC sensor 10. In some cases, the controls 25 may provide the capability to program a daily schedule, or even multi-day schedules of desired settings for humidity, temperature, and the like, if desired.

In an illustrative wall-mounted configuration, the HVAC sensor 10 may includes vents or other apertures 82, 84 in the sidewalls 34 or base plate 30 of the case or housing (see FIG. 3) which allow room air to circulate through the housing and over a sensor 54 or sensors (see FIG. 2A) from the room environment to be sampled. In such a wall-mounted installation, a first side of the base plate (i.e. the side facing away from the wall 80) is usually within the environment to be sampled or in fluid communication with it through the vents 82, 84 in the housing of the HVAC sensor 10. In the illustrative embodiment, the sensor 54 may then generate a signal that is conveyed to the control module circuit board 52 (see FIG. 2A). When the HVAC sensor 10 is configured to also control one or more HVAC components, the control module circuit board 52 may send one or more signals to one or more HVAC components for modifying, for example, the temperature and/or humidity of the air supplied to the room.

A movable element 50 (see FIGS. 2B and 3) may include a portion of an interior partition or a conduit within the HVAC sensor housing, which is placed (or removed) to direct the circulating air flow, often a simple convective or even diffusional flow, to and over the sensor 54 and/or other sensors that may be present. In some cases, the movable element 50 may be positioned (or removed) to optionally unblock the apertures or vents 82, 84 in the housing (see FIG. 3), complete a flow conduit between the vents or apertures, remove a shield around the sensor 54, or otherwise provide a path for room air to circulate past the sensor 54 in question. In some embodiments, this first position of the movable element may also block any air flow through the base plate 30 (see FIG. 3), although such flows through the base plate may already be blocked by the wall 80 to which the HVAC sensor 10 is mounted or by an optional removable plug (not shown) in the base plate 30. In some cases, and as further described below, flows through the base plate 30 may be permitted, and the controller of the HVAC sensor 10 may be programmed or otherwise configured to read the sensor 54 only at appropriate times.

In some cases, the movable element 50 may be associated with a sidewall 34, base plate 30, faceplate 36, control module 52, or other structure within the housing, and may be positioned at least partially between the base plate 30 and the faceplate 36, but this is not required. It may take the form of a flat or curved partition, an interior wall or shield, or even a generally tubular conduit 50 (see FIG. 3) which may be moved from one position to another, depending on the desired configuration of the HVAC sensor 10. In some instances, the movable element 50 may be removed from the HVAC sensor 10 or removed from a functional position and placed in a storage position within the HVAC sensor housing, if desired. In some embodiments, the movable element 50 may be secured relative to the HVAC sensor housing in one or more positions, such as the duct mounting position by, for example, a latch 58 (see FIG. 3).

Figure 2B:
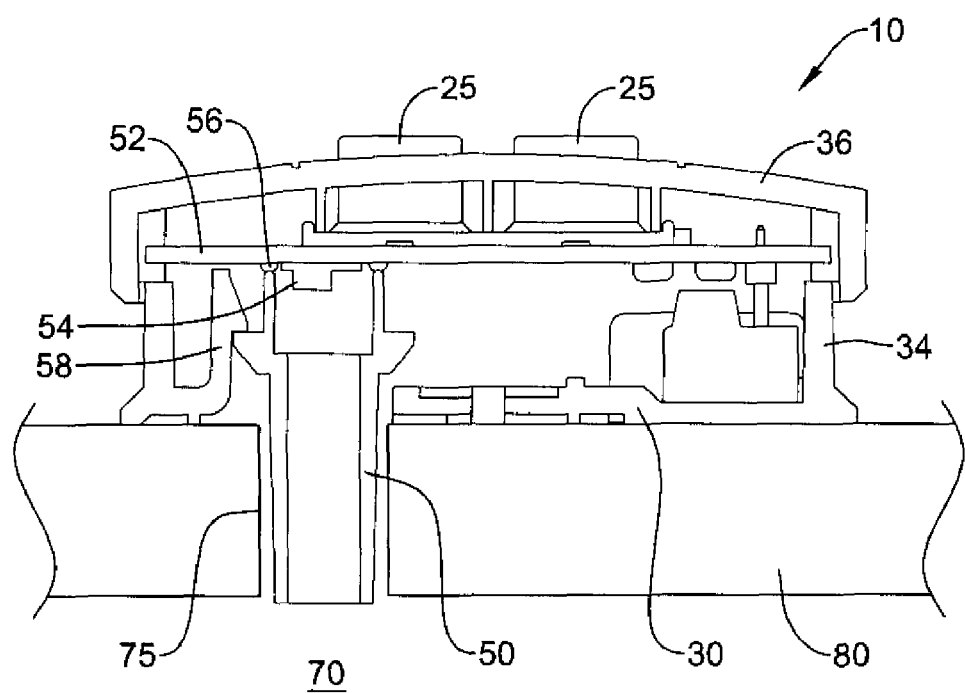
Figure 3:
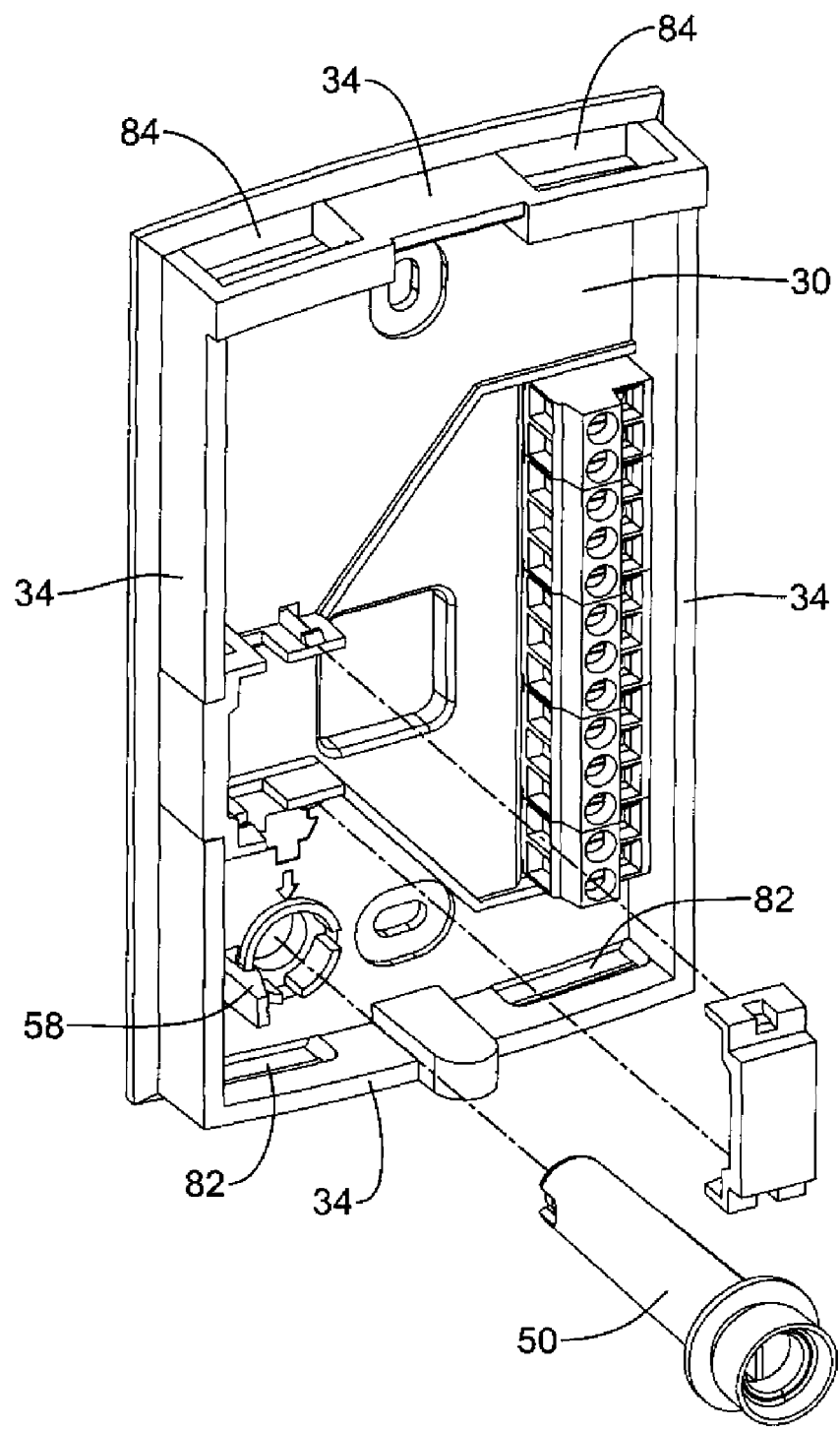
FIG. 3 is a perspective view of the base plate of the illustrative HVAC sensor of FIG. 1.

In an illustrative duct-mounted configuration of FIG. 2B, the movable element 50 may complete a conduit or other fluid passageway between an aperture in the base plate 30, which aligns with a hole 75 in the duct wall 80 to which the HVAC sensor 10 is mounted, and the sensor 54 or sensors. In the illustrative embodiment shown in FIG. 2B, the movable element 50 may have side walls that form a conduit or lumen that extends from the sensor 54, located within the HVAC sensor housing, through the back plate, and to or into the duct. Since the air within a supply duct 70 is generally pressurized with respect to the adjacent room when air is being delivered (e.g. when the HVAC fan is on), outflow from the duct 70 through the base plate 30 may be directed by the movable element 50 to and over the sensor 54 within the HVAC sensor housing. Optionally, the flow of duct air may be minimized or blocked by the movable element 50 by including or mating with an isolating gasket 56. This may also help isolate the sensor 54 from convective air passing through the vents 82, 84, when desired. As in the case of the wall-mounted configuration described above, the movable element 50 may be associated with a sidewall 34, base plate 30, faceplate 36, control module 52, or other structure within the housing, and may be positioned at least partially between the base plate 30 and the faceplate 36, but this is not required. The movable element 50 may take the form of a flat or curved partition, an interior wall or shield, or even a generally tubular conduit 50 as shown in FIG. 3 which may be moved from one position to another, depending on the desired configuration of the HVAC sensor 10.

In some embodiments, the movable element 50 in a duct-mounted installation may be positioned to block circulating room air from reaching the sensor 54, while in others it may allow circulating room air to reach the sensor 54, particularly when the duct is not pressurized. In the latter configurations, a duct-mounted HVAC sensor 10 may be capable or configured to sample the environment within the duct 70 when the duct 70 is pressurized, and sample the environment within the room when the duct 70 is not pressurized.

Particularly in embodiments in which the HVAC sensor 10 is duct-mounted, it may be useful to have the movable element 50 be, or include, an electrical component such as a switch, which may encompass a movable jumper or electrical connection, or a programming option, as desired. In some embodiments, the switch, jumper, electrical connection or programming option may alter the response of the control module to the sensor signal. For example, the control module, which may be located on the control module circuit board 52 within the HVAC sensor housing, may sample the room environment when the duct is not pressurized, as between active fan cycles, and/or sample the environment within the duct 70 when the duct is pressurized. Information from one or both conditions may be used to enhance the overall performance of an associated HVAC system. For example, the HVAC sensor 10 may sample the room environment until a control point is reached. It may then send one or more service demand signals to a unit such as a furnace, air conditioner, humidifier, and/or dehumidifier to begin circulation of air through the duct and room. Once the duct 70 is pressurized by circulating air within the duct 70, the sensor 54 may become bathed by air from the duct 70 and may be capable of controlling the environment within the duct 70 which is being supplied to the room.

In other embodiments, the sampling of the room environment may simply result in the transmission of a signal to a central control unit which integrates information about the conditions within the building as a whole between active fan cycles of the HVAC system. Similarly, the information regarding the environment within the duct 70, while the duct 70 is pressurized, may be transmitted to a central control unit for use in overall building management. In some embodiments, such a dual function may allow a single HVAC sensor 10 to sample conditions within a local room environment as well as within a duct 70 which services the same of a different part of the building if the duct passes through, or adjacent to, the room in which the HVAC sensor 10 is mounted.

In some embodiments, the moveable element 50 is a partition or conduit which may be moved to a first position in which the sensor 54 is in fluid communication with a first environment such as the room in which the HVAC sensor 10 is located. In some embodiments, when the moveable element 50 is in the first position, it either blocks or greatly reduces air from the second environment from reaching the sensor(s) while allowing air in the room to circulate through vents or other apertures 82, 84 in the housing, but this is not required in all embodiments. In some cases, the movable element may include two or more movable sub-elements, such as a movable conduit 50 as shown in FIG. 4 and a knock out plug that covers the aperture in the back plate 30 that receives the movable conduit 50.

In other embodiments, the location and nature of the movable element 50 may allow pressurized air within the duct 70 adjacent to the HVAC sensor 10 to substantially displace the room air which would otherwise reach the sensor 54. In those embodiments, the moveable element 50 may be a switch or other programming option that alters the subsequent processing of the signal from the sensor 54 or sensors in response to whether the duct is expected to be pressurized or not. Generally, a supply duct may be expected to be pressurized when the corresponding fan or blower moving air through the duct 70 is turned on. As discussed above, and in some illustrative embodiments, when the duct 70 is pressurized, the HVAC sensor 10 may respond to the environmental conditions within the duct 70, and when the duct 70 is not pressurized, the HVAC sensor 10 may respond to the environmental conditions within the room and the sensor signals are processed and transmitted accordingly.

In certain embodiments, when the moveable element 50 is in a second position, the sensor 54 is placed in fluid communication with a second environment, for example the environment within a duct 70, through an aperture in the base plate 30. In the illustrative embodiment shown in FIG. 2B and FIG. 3, the aperture in the base plate 30 is aligned with a hole 75 in the duct 70 or other wall separating the base plate 30 from the interior of the duct 70, and the moveable element 50 in the second position substantially prevents or at least impedes air from the first environment (e.g. the room in which the HVAC sensor 10 is mounted) from reaching the sensor 54. The movable element 50, for example, may be configured to complete a conduit between the base plate aperture and the sensor 54, while simultaneously blocking a flow path between the environment in the room and the sensor 54 via vents 82, 84. In some embodiments, the movable element 50 may be a flexible tube or rigid conduit having a first end adjacent the sensor 54, and a second end that may be attached near, for example a housing vent in a first position and near an aperture in the base plate 30 in the second position. In some embodiments, the conduit linking the sensor 54 may extend beyond the base plate 30 for a sufficient distance in the second position such that the conduit opens into the duct through a sidewall 80 of the duct 70. In other embodiments, the hole 75 through the duct 70 may form a part of the conduit linking the interior of the duct 70 with the sensor 54.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

What is claimed is:

1. An HVAC controller for use in conjunction with an HVAC system having a duct, the HVAC controller comprising:
   a housing configured to be mounted external to the duct, the housing including a controller and a sensor, the controller in communication with the sensor, the sensor is mounted such that when the housing is mounted external to the duct, the sensor is positioned external to the duct; and
   a conduit defined by conduit walls, the conduit having a first end and a second end, the first end of the conduit is configured to extend toward the duct of an HVAC system and adjacent a hole in the duct when such a hole is present, and the second end of the conduit is positioned adjacent to the sensor, such that the conduit can direct pressurized air emanating from the hole in the duct toward the sensor.

2. The HVAC controller of claim 1, wherein the conduit is formed by a movable element movable between at least a first position and a second position, wherein the conduit can direct pressurized air emanating from the hole in the duct, when present, toward the sensor when the movable element is in the first position, and does not direct pressurized air emanating from the hole in the duct, when present, toward the sensor when the movable element is in the second position.

3. The HVAC controller of claim 2, wherein the housing includes one or more vents in fluid communication with an environment surrounding the housing, said one or more vents allowing air to pass from the environment to the sensor when the movable element is in the second position.

4. The HVAC controller of claim 3, wherein the movable element is positioned in the field into the first position when the sensor is to sense pressurized air emanating from a duct, and is positioned in the second position when the sensor is to sense the air that passes through the one or more vents.

5. The HVAC controller of claim 1, wherein the controller is configured to control one or more HVAC components of the HVAC system based, at least in part, on a parameter sensed by the sensor.

6. The HVAC controller of claim 1, wherein the sensor is a humidity sensor.

7. The HVAC controller of claim 1, wherein the sensor is a temperature sensor.

8. The HVAC controller of claim 1, wherein the sensor is a carbon dioxide sensor.

9. The HVAC controller of claim 1, wherein the sensor is a carbon monoxide sensor.

10. The HVAC controller of claim 1, wherein the conduit extends beyond a back side of the housing toward the duct for a sufficient distance such that the first end of the conduit can extend through a hole in the duct.

11. The HVAC controller of claim 1, wherein the HVAC system includes a fan that, when activated, creates the pressurized air in the duct, and wherein the controller is configured to not use readings from the sensor when controlling one or more HVAC components of the HVAC system when the fan of the HVAC system is deactivated.

12. The HVAC controller of claim 1, wherein the HVAC system includes a fan that, when activated, creates the pressurized air in the duct, and wherein the controller is configured to use a first control algorithm to control one or more HVAC components of the HVAC system when the fan of the HVAC system is deactivated, and to use a second control algorithm when the fan of the HVAC system is activated.

13. A humidity sensor for monitoring humidity inside a room or for monitoring humidity inside a duct, the humidity sensor comprising:
a face plate;
a base plate having an aperture therethrough, the base plate having a first side facing the face plate and a second side facing away from the face plate;
one or more sidewall;
a humidity sensor positioned between the face plate and the base plate;
a controller;
a movable element movable between a first position and a second position, selectable at the time of installation; and
wherein the first position of the movable element configures the humidity sensor to sense an environment adjacent the first side of the base plate, and the second position of the movable element configures the humidity sensor to sense an environment on the second side of the base plate.

14. The humidity sensor of claim 13 wherein in the first position, the movable element places the humidity sensor in fluid communication with the environment on the first side of the base plate, and in the second position the movable element places the humidity sensor is in fluid communication with the environment on the second side of the base plate.

15. The humidity sensor of claim 13, wherein the movable element includes one or more of a partition and a conduit.

16. The humidity sensor of claim 13, wherein the movable element includes an electrical switch, wherein the first position of the electrical switch configures the humidity sensor to monitor the environment adjacent the first side of the base plate and the second position of the electrical switch configures the humidity sensor to monitor the environment adjacent the second side of the base plate when the pressure in the second environment is greater than the pressure in the first environment.

* * * * *